(12) United States Patent
Shestak et al.

(10) Patent No.: US 7,626,644 B2
(45) Date of Patent: Dec. 1, 2009

(54) MULTIVIEW AUTOSTEREOSCOPIC DISPLAY

(75) Inventors: Sergey Shestak, Suwon-si (KR); Dae-sik Kim, Suwon-si (KR); Sung-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 11/785,348

(22) Filed: Apr. 17, 2007

(65) Prior Publication Data
US 2007/0258140 A1 Nov. 8, 2007

Related U.S. Application Data

(60) Provisional application No. 60/797,372, filed on May 4, 2006.

(30) Foreign Application Priority Data

Jul. 19, 2006 (KR) .................. 10-2006-0067302

(51) Int. Cl.
G02B 27/26 (2006.01)
H04N 13/00 (2006.01)
(52) U.S. Cl. ................ 349/15; 359/465; 348/57
(58) Field of Classification Search .............. None
See application file for complete search history.

(56) References Cited

U.S. PATENT DOCUMENTS 5,917,562 A * 6/1999 Woodgate et al. .......... 349/15
7,408,600 B2 * 8/2008 Yata et al. .................. 349/75
2003/0107805 A1 * 6/2003 Street ....................... 359/464
2004/0240777 A1 * 12/2004 Woodgate et al. .......... 385/16
2005/0168815 A1 * 8/2005 Maruyama et al. ......... 359/465
2006/0209407 A1 * 9/2006 Hamagishi ................. 359/465
2007/0008406 A1 * 1/2007 Shestak et al. .............. 348/58
2007/0035672 A1 * 2/2007 Shestak et al. .............. 349/15
2007/0153380 A1 * 7/2007 Shestak ..................... 359/463
2007/0165145 A1 * 7/2007 Sugiyama .................. 349/15
2008/0036853 A1 * 2/2008 Shestak et al. .............. 348/51

* cited by examiner

*Primary Examiner*—Mike Stahl
(74) *Attorney, Agent, or Firm*—Sughrue Mion, PLLC

(57) ABSTRACT

A multiview autostereoscopic display includes: a backlight; a first polarized panel transmitting light having a first polarization; a first polarization switch changing the polarization of incident light; a first anisotropic device array including anisotropic devices sequentially and repeatedly arranged in a horizontal direction, such that light transmitted from neighboring anisotropic devices has perpendicular polarizations; a lenticular lens array having lenticular lens devices, arranged horizontally, which separate incident light into different directions; a second polarized panel transmitting light having a second polarization; a second anisotropic device array having anisotropic devices alternately horizontally arranged, such that the anisotropic devices transmit light having perpendicular polarizations; a second polarization switch changing the polarization of light from the lenticular lens array; a third anisotropic device array having anisotropic devices, alternately vertically arranged, such that the anisotropic devices transmit light having perpendicular polarizations; and a display panel forming an image by modulating incident light.

23 Claims, 12 Drawing Sheets

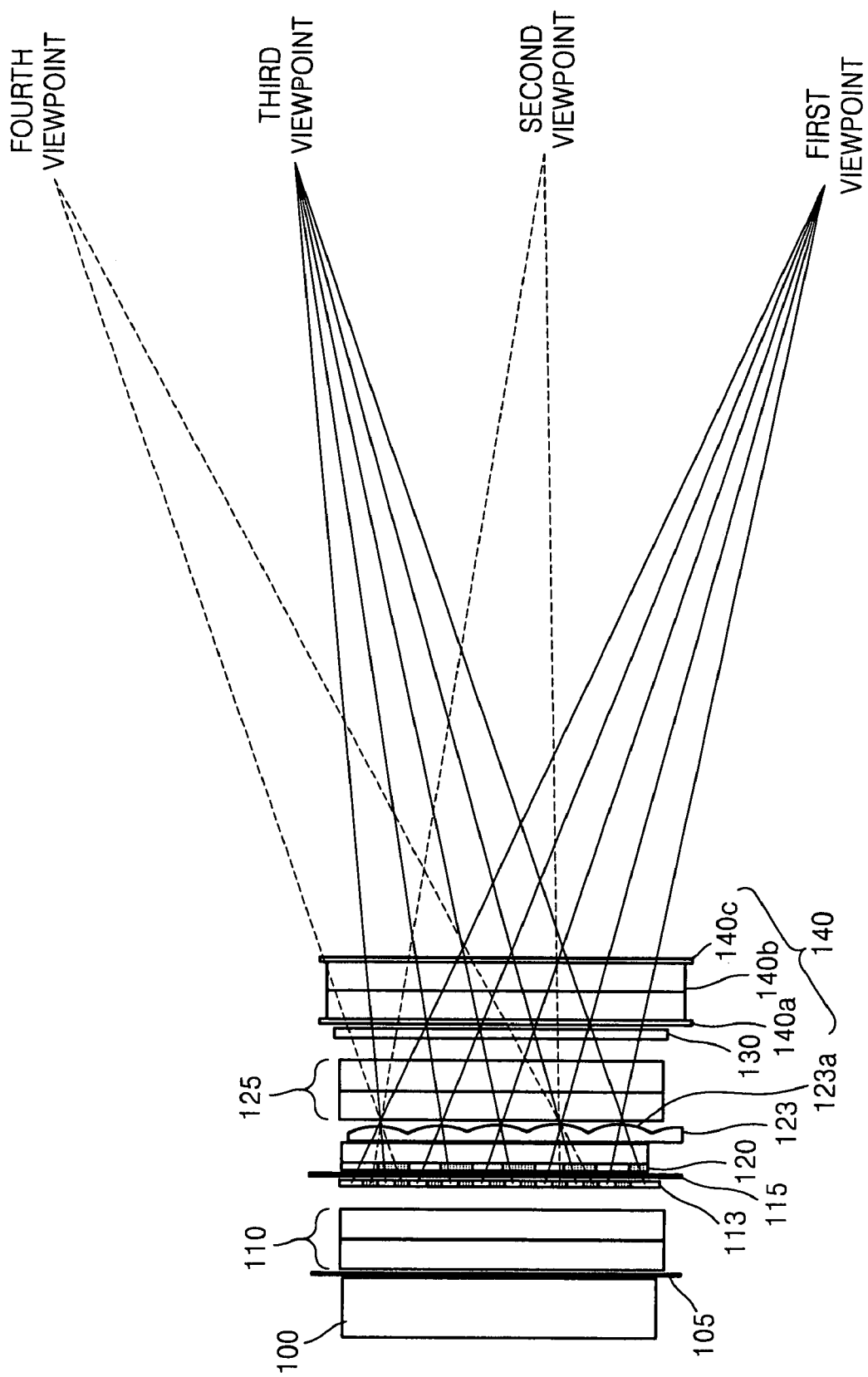

MULTIVIEW AUTOSTEREOSCOPIC DISPLAY

CROSS-REFERENCE TO RELATED PATENT APPLICATIONS

This application claims the benefit of Korean Patent Application No. 10-2006-0067302, filed on Jul. 19, 2006, in the Korean Intellectual Property Office, and the benefit of U.S. Provisional Patent Application No. 60/797,372, filed on May 4, 2006, in the U.S. Patent and Trademark Office, the disclosures of which are incorporated herein in their entirety by reference.

BACKGROUND OF THE INVENTION

1. Field of the Invention

The present invention relates to a multiview autostereoscopic display having an extended viewing zone enabling the viewer to see an autostereoscopic image from various positions.

2. Description of the Related Art

A binocular parallax method is an effective method for providing an autostereoscopic image in a flat panel display. The binocular parallax method provides a three dimensional image by separating the viewing zones of a left eye and a right eye of a stereopair in order to allow the left and right eyes of a viewer to see different images. A method of separating the left eye image and the right eye image includes a lenticular method, using a lenticular lens array, and a parallax barrier method. According to related art technology, a set of columns, for example, odd columns, are displayed for the left eye image and even columns are displayed for the right eye image. Since the left eye image and the right eye image area are displayed on the same display panel, however, there is a problem in that the resolution of each image is not more than half the full resolution of the display panel.

As LCD panels having a fast response are recently being developed, the presentation of an autostereoscopic image having the full resolution of an LCD panel may be possible by using a frame that serially displays a left eye image and a right eye image. In this case, both the left eye image and the right eye image are displayed with the full resolution of the display panel. In this system, in order to provide a sequential display of the frames, a means for displaying the left eye image and the right eye image by selectively switching between the left eye image and the right eye image is required. For example, the resolution of a three dimensional image can be improved using a polarization switch using polarization characteristics. However, a conventional three dimensional image apparatus has a very narrow viewing zone because the conventional three dimensional image apparatus only provides the image in two viewpoints. Thus, when a viewer moves his head, the left and right images are reversed so that the viewing of a three dimensional image is improper. To solve the problem, an eye-tracking method is used. However, the eye-tracking method has the limitation of only applying to a single viewer.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Exemplary embodiments of the present invention provide a multiview autostereoscopic display that extends a viewing zone of a viewer and enables a viewer to see an autostereoscopic image even when the position of the viewer changes.

According to an aspect of the present invention, there is provided a multiview autostereoscopic display including: a backlight unit; a first polarized panel which transmits light emitted form the backlight unit having a first polarization direction; a first polarization switch which changes the polarization direction of light incident thereon; a first anisotropic device array comprising first, second, third, and fourth anisotropic devices which are sequentially and repeatedly arranged in a horizontal direction, which transmits light such that light transmitted by an anisotropic device has a polarization perpendicular to a polarization of light transmitted by a neighboring anisotropic device; a lenticular lens array comprising a plurality of lenticular lens devices which are arranged in the horizontal direction, the lenticular lens array separating light transmitted form the first, second, third, and fourth anisotropic devices into different directions; a second polarized panel which transmits light emitted form the lenticular lens array having a second polarization direction; a second anisotropic device array, comprising fifth and sixth anisotropic devices, alternately arranged in the horizontal direction, which transmits light such that light transmitted by the fifth anisotropic devices has a polarization perpendicular to a polarization of light emitted from the sixth anisotropic devices; a second polarized switch which changes the polarization direction of light incident thereon; a third anisotropic device array, comprising seventh and eighth anisotropic devices which are alternately arranged in a vertical direction, which transmits light such that light transmitted by the seventh anisotropic devices has a polarization perpendicular to a polarization of light transmitted by the eighth anisotropic devices; and a display panel which forms an image by modulating incident light.

The first through fourth anisotropic devices each correspond to one of the lenticular lens devices.

A pitch of the lenticular lens devices is the same as or less than a sum of widths in the horizontal direction of the first through fourth anisotropic devices.

The fifth and sixth anisotropic devices each correspond to one of the lenticular lens devices.

A pitch of the lenticular lens devices is the same as or less than a sum of widths in the horizontal direction of the fifth and sixth anisotropic devices.

Each of the seventh and eighth anisotropic devices corresponds to one of a plurality of pixel lines of the display panel.

An opaque mask having a stripe shape is disposed between the seventh and eighth anisotropic devices.

A black matrix is arranged between pixels of the display panel. A width of the black matrix in the vertical direction is D1; a width of the opaque mask in the vertical direction is D2; a distance between the pixel of the display panel and the third anisotropic device array is t; a viewing distance from the display panel is L; and a height H2 of a viewing zone where crosstalk does not occur satisfies an equation that $H2=(L/t)(D1+D2)$.

A width in the vertical direction of the seventh and eighth anisotropic devices is the same as or greater than a pitch in the vertical direction between pixel lines of the display panel.

Each of the first and second polarization switches includes a liquid crystal retarder that is electrically controllable, or a polarization rotator.

A distance between the first anisotropic device array and the lenticular lens array is the same as or greater than a focal length of the lenticular lens device.

Each of the first through fourth anisotropic devices comprises a polarizer having a predetermined polarization surface, wherein the polarization surfaces of neighboring anisotropic devices are perpendicular to each other.

Each of the fifth and sixth anisotropic devices comprises a polarizer having a predetermined polarization surface, wherein the polarization surfaces of the polarizers forming the fifth and sixth anisotropic devices are perpendicular to each other.

Each of the seventh and eighth anisotropic devices comprises a polarizer having a predetermined polarization surface, wherein the polarization surfaces of the polarizers forming the seventh and eighth anisotropic devices are perpendicular to each other.

BRIEF DESCRIPTION OF THE DRAWINGS

The above and other exemplary aspects of the present invention will become more apparent by the following detailed description of exemplary embodiments thereof with reference to the attached drawings in which:

FIG. 2 illustrates a plan view of the multiview autostereoscopic display of FIG. 1, according to an exemplary embodiment of the present invention;

DETAILED DESCRIPTION OF EXEMPLARY EMBODIMENTS OF THE INVENTION

Figure 1:
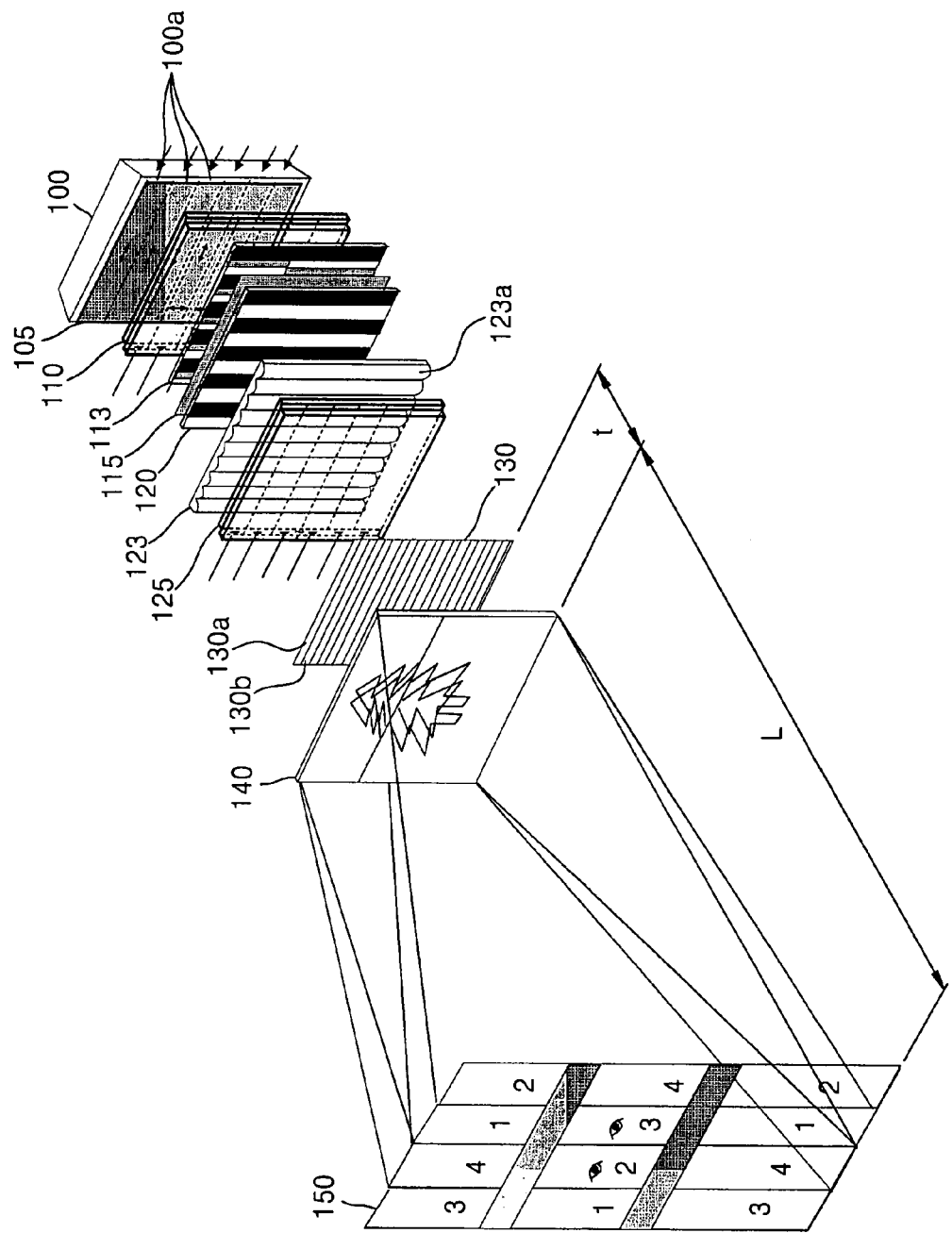
FIG. 1 illustrates a perspective view of a multiview autostereoscopic display according to an exemplary embodiment of the present invention.

FIG. 1 illustrates a perspective view of a multiview autostereoscopic display according to an exemplary embodiment of the present invention. Referring to FIG. 1, the multiview autostereoscopic display according to the present embodiment includes a backlight unit 100; a first polarized panel 105 which only transmits the portion of the light from the backlight unit 100 which has a particular polarization direction; a first polarization switch 110 which changes the polarization direction of an incident beam by an electric control; and a first anisotropic device array 113.

The multiview autostereoscopic display also includes a second polarized panel 115 which, of the light emitted from the first anisotropic device array 113, only transmits light having a particular polarization direction; a second anisotropic device array 120; a lenticular lens array 123 which separates the incident beam into viewing zones; a second polarization switch 125 which changes the polarization direction of the incident beam; and a third anisotropic device array 130. The multiview autostereoscopic display further includes a liquid crystal display (LCD) panel 140 which forms an image by modulating the incident beam in units of pixels. Reference number 150 refers to a viewing plane.

The backlight unit 100 that supplies light to the LCD panel 140 can include a direct type of backlight unit 100 by which the light is illuminated directly towards the LCD panel 140 and can include an edge light type of backlight unit 100 by which light is illuminated through a light guide plate from the side of the backlight unit 100. The type of backlight unit 100 may be selected according to the size of the LCD panel 140. The direct type of backlight unit 100 is suitable for large-sized display devices while the edge type is suitable for mid- and small-sized display devices.

The first and second polarized panels 105 and 115 only transmit light having a particular polarization direction. For example, the first and second polarized panels 105 and 115 may transmit only light having a polarization direction, for example, horizontally polarized light, or the first polarized panel 105 may transmit light having a first polarization direction, for example, horizontally polarized light, and the second polarization panel 115 may transmit light having a second polarization direction, for example, vertically polarized light. However, the transmission characteristics of the first and second polarized panels 105 and 115 are not limited thereto and can be differently designed according to the polarization direction used in the LCD panel 140.

The first and second polarization switches 110 and 125 comprise electrically controlled devices that can change the polarization direction of the incident beam according to the amplitude of an applied voltage and can be switched in synchronization with the operation of the LCD panel 140. For example, a liquid crystal retarder that is electrically controllable or a polarization rotator can be used as a polarization switch. In the present embodiment, a liquid crystal retarder having a switching speed of about 180 Hz is utilized at a relatively low cost. When the first and second polarization switches 110 and 125 are formed of liquid crystal retarders, for example, and the first and second polarization switches 110 and 125 are on, the incident beam is not delayed and when the first and second polarization switches 110 and 125 are off, the incident beam is phase-delayed by ½ wavelength ($\lambda/2$).

The changed angle of the polarization direction by the first and second polarization switches 110 and 125 is exemplary and can be differently designed according to the polarization directions of the polarizers of the first and second polarized panels 105 and 115 and the LCD panel 140.

Figure 3A:
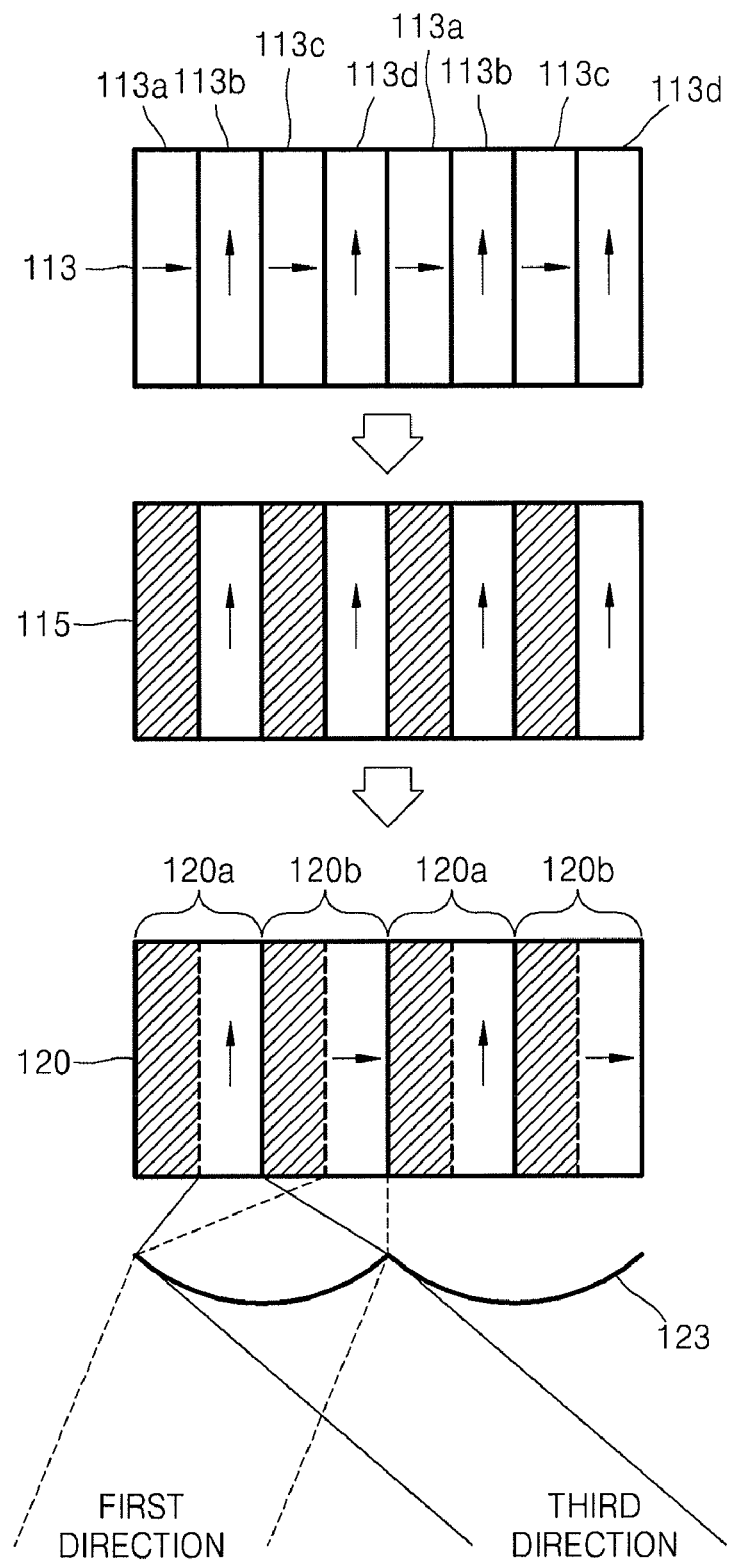
FIG. 3A illustrates a view for explaining the operation of an image formed when a first polarization switch in the multiview autostereoscopic display of FIG. 1 is off, according to an exemplary embodiment of the present invention.

FIG. 2 illustrates a plan view of the multiview autostereoscopic display of FIG. 1, according to an exemplary embodiment of the present invention. Referring to FIG. 2, the first anisotropic device array 113, for example, can be arranged on a focal surface of the lenticular lens array 123. First through fourth anisotropic devices 113a, 113b, 113c, and 113d, as illustrated in FIG. 3a, are sequentially and repeatedly arranged accordingly in the horizontal direction of the multiview autostereoscopic display. The first through fourth anisotropic devices 113a, 113b, 113c, and 113d are longer in the vertical direction of the multiview autostereoscopic display. The first anisotropic device array 113 changes the polarization direction of the incident beam such that the polarization directions of the beams passing through the first through fourth anisotropic devices 113a, 113b, 113c, and 113d are perpendicular to one another.

For example, each of the first through fourth anisotropic devices 113a, 113b, 113c, and 113d can be formed of polarizers having polarization surfaces oriented in a predetermined direction. In the present invention, the polarization surfaces of the polarizers forming the first and third anisotropic devices 113a and 113c are the same and the polarization surfaces of the polarizers forming the second and fourth anisotropic devices 113b and 113d are the same. The polarization surfaces of the polarizers forming the first and third anisotropic devices 113a and 113c and the polarization surfaces of the polarizers forming the second and fourth anisotropic devices 113b and 113d are perpendicular to each other. Also, the first through fourth anisotropic devices 113a, 113b, 113c, and 113d can comprise retarders that delay the incident light by a predetermined phase. In the present embodiment, the retarders forming the first and third anisotropic devices 113a and 113c have no phase delay difference and the retarders forming the second and fourth anisotropic devices 113b and 113d are formed such that the phase delay difference is $\lambda/2$.

The retarders forming the first and third anisotropic devices 113a and 113c and the retarders forming the second and fourth anisotropic devices 113b and 113d are such that a phase delay difference between the first and third anisotropic devices 113a and 113c and the second and fourth anisotropic devices 113b and 113d is $\lambda/2$. For example, the first and third anisotropic devices 113a and 113c do not delay the phase of the incident light and the second and fourth anisotropic devices 113b and 113d delay the phase of the incident light by $\lambda/2$, or the first and third anisotropic devices 113a and 113c delay the phase of the incident light by $-\lambda/2$ and the second and fourth anisotropic devices 113b and 113d delay the phase of the incident light by $+\lambda/2$. Also, the first and second anisotropic devices 113a and 113b can comprise rotators which rotate the incident light by a predetermined angle. In the present embodiment, the rotator forming the first anisotropic device 113a and the rotator forming the second anisotropic device 113b are such that a difference in rotational angle of the incident light between the first anisotropic device 113a and the second anisotropic device 113b is 90°. For example, the first anisotropic device 113a does not rotate the incident light while the second anisotropic device 113b rotates the incident light by 90°, or the first anisotropic device 113a rotates the incident light by $-45°$ while the second anisotropic device 113b rotates the incident light by $+45°$.

According to the present embodiment, the light passing through the first polarized panel 105, the first polarization switch 110, and the first anisotropic device array 113 may have one of the following polarization statuses according to the on-off switching of the first polarization switch 110. First, the light passing through the first and third anisotropic devices 113a and 113c has a horizontal polarization while the light passing through the second and fourth anisotropic devices 113b and 113d has a vertical polarization. Second, the light passing through the first and third anisotropic devices 113a and 113c has a vertical polarization while the light passing through the second and fourth anisotropic devices 113b and 113d has a horizontal polarization.

Next, the second anisotropic device array 120 comprises fifth and sixth anisotropic devices 120a and 120b, as illustrated in FIG. 3A, that are alternately arranged along the horizontal direction of the multiview autostereoscopic display. The fifth and sixth anisotropic devices 120a and 120b are longer in the vertical direction of the multiview autostereoscopic display. For example, the fifth anisotropic device 120a can be arranged in odd columns of the second anisotropic device array 120 while the sixth anisotropic device 120b can be arranged in even columns of the second anisotropic device array 120. The second anisotropic device array 120 changes the polarization direction of the incident light such that the polarization directions of the light passing through the fifth and sixth anisotropic devices 120a and 120b can be perpendicular to each other. The second anisotropic device array 120 is formed of polarized panels having polarization surfaces that are perpendicular to each other, retarders having a phase delay difference of $\lambda/2$ between the retarders, or rotators having a rotation angle difference of 90° between the rotators. Since the structure and operation of the second anisotropic device array 120 are substantially the same as those of the first anisotropic device array 113, a detailed description thereof will be omitted herein.

The lenticular lens array 123 is formed of a plurality of lenticular lens devices 123a arranged in the horizontal direction of the multiview autostereoscopic display. Each of the lenticular lens devices 123a are longer in the vertical direction of the multiview autostereoscopic display and parallel to the first through fourth anisotropic devices 113a, 113b, 113c, and 113d and the fifth and sixth birefringent devices 120a and 120b. The first through fourth anisotropic devices 113a, 113b, 113c, and 113d can be arranged such that each corresponds to one of the lenticular lens devices 123a and the fifth and sixth anisotropic devices 120a and 120b can be arranged such that each corresponds to one of the lenticular lens devices 123a.

The lenticular lens array 123 emits the incident light by separating the incident light into a plurality of viewpoints. The light passing through the lenticular lens array 123 is separated in different viewing zones of different viewpoints at a viewing distance according to the position where the incident light is incident on the lenticular lens array 123, and forms images. For example, the light output from the first anisotropic device 113a can proceed in a fourth direction for a fourth viewpoint through the lenticular lens array 123; the light output from the second anisotropic device 113b can proceed in a third direction for a third viewpoint; the light output from the third anisotropic device 113c can proceed in the second direction for the second viewpoint; and the light output from the fourth anisotropic device 113d can proceed in a first direction for a first viewpoint.

As is known in the related art, the interval between the neighboring viewpoints at the viewing distance may be about 65 mm. The pitch between the lenticular lens devices 123a of the lenticular lens array 123 may be the same as the pitch of a pair of anisotropic device arrays formed of the first through fourth anisotropic devices 113a, 113b, 113c, and 113d, or may be slightly less than the same pitch of the pair of anisotropic device arrays. That is, the width of the lenticular lens device 123a may be the same as or slightly less than the sum of the widths of the first through fourth anisotropic devices 113a, 113b, 113c, and 113d. Also, the distance between the lenticular lens array 123 and the first anisotropic device array 113 may be the same as or slightly greater than the focal length of the lenticular lens devices 123a of the lenticular lens array 123.

The second polarization switch 125 and the third anisotropic device array 130 are disposed after the lenticular lens array 123. However, the second polarization switch 125 may be disposed before the lenticular lens array 123.

The third anisotropic device array 130 comprises seventh and eighth anisotropic devices 130a and 130b as shown in FIG. 1 that are longer in the horizontal direction of the multiview autostereoscopic display and can be alternately arranged along the vertical direction of the multiview autostereoscopic display. The polarization directions of the light passing through the seventh and eighth anisotropic devices 130a and 130b of the third anisotropic device array 130 are perpendicular to each other. For example, the seventh and eighth anisotropic devices 130a and 130b of the third anisotropic device array 130 comprise polarized panels having polarization surfaces perpendicular to each other, retarders having a phase delay difference of $\lambda/2$ between the seventh and eighth anisotropic devices 130a and 130b, or rotators having a rotation angle difference of 90°. Since the structure and operation of the seventh and eighth anisotropic devices 130a and 130b of the third anisotropic device array 130 are substantially the same as those of the first and second anisotropic device arrays 113 and 120, even if is in the arrangement direction of the seventh and eighth anisotropic devices 130a and 130b is different from those of the first and second anisotropic device arrays 113 and 120, and thus a detailed description thereof will be omitted herein.

The LCD panel 140 includes a front polarizer 140a, a rear polarizer 140c, and a liquid crystal layer 140b arranged between the front polarizer 140a and the rear polarizer 140c. The front polarizer 140a of the LCD panel 140 transmits light polarized in a certain direction and, as the arrangement of the liquid crystal of the liquid crystal layer is changed by an electric control, the transmissivity of the polarized light varies in units of pixels according to the arrangement of the liquid crystal of the liquid crystal layer so as to form an image.

Figure 3B:
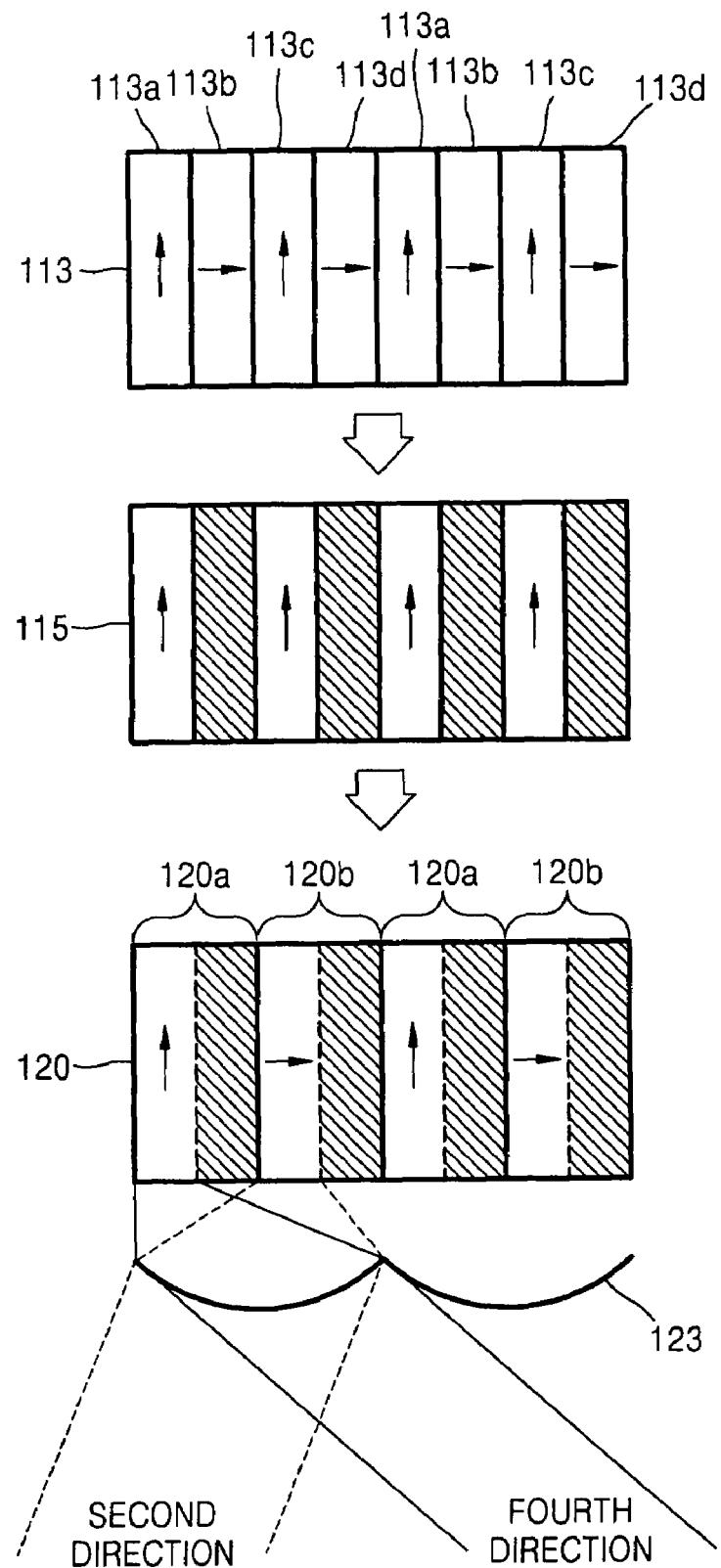
FIG. 3B illustrates a view for explaining the operation of an image formed when the first polarization switch of the multiview autostereoscopic display of FIG. 1 is on, according to an exemplary embodiment of the present invention.

The operation of the multiview autostereoscopic display according to the present embodiment will be described in detail. In the present embodiment, four types of frames can be formed according to the on-off status of the first and second polarization switches 110 and 125. That is, there is a first frame in which the first and second polarization switches 110 and 125 are off; a second frame in which the first polarization switch 110 is on and the second polarization switch 125 is off; a third frame in which the first polarization switch 110 is off and the second polarization switch 125 is on; and a fourth frame in which the first and second polarization switches 110 and 125 are on. Referring to FIG. 3A, the first frame in which the first and second polarization switches 110 and 125 are off will be described. It is assumed that the first polarized panel 105 only transmits horizontally polarized light and the second polarized panel 115 only transmits vertically polarized light. In FIGS. 3A and 3B, the directions of the arrows indicate the direction of polarization.

The light emitted from the backlight unit 100 is polarized, for example, into horizontally polarized light by the first polarized panel 105 and the polarization direction of the light is changed according to the on-off status of the first polarization switch 110. When the first polarization switch 110 is off, the horizontally polarized light is changed to vertically polarized light and vertically polarized light is incident on the first anisotropic device array 113. For example, the light passing through the first and third anisotropic devices 113a and 113c is changed to horizontally polarized light and the light passing through the second and fourth anisotropic devices 113b and 113d is changed to vertically polarized light. Then, only the vertically polarized light passes through the second polarized panel 115. Thus, in the present embodiment, only the light passing through the second and fourth anisotropic devices 113b and 113d is incident on the second anisotropic device array 120. When the vertically polarized light passes through the second anisotropic device array 120, the light passing through the fifth anisotropic device 120a remains vertically polarized light and the light passing through the sixth anisotropic device 120b is changed to horizontally polarized light.

The vertically polarized light and the horizontally polarized light are separated by the lenticular lens array 123, such that they are emitted in different directions. The vertically polarized light is directed in the third direction (the third viewpoint) and the horizontally polarized light is directed in the first direction (the first viewpoint). Next, when the second polarization switch 125 is off, the polarization direction is changed so that the light is incident on the third anisotropic device array 130. Of the vertically polarized light proceeding towards the third direction, the light passing through the seventh anisotropic device 130a is changed to horizontally-polarized light, and the light passing through the eighth anisotropic device 130b remains polarized in the vertical direction. Of the horizontally polarized light proceeding towards the first direction, the light passing through the seventh anisotropic device 130a is changed to vertically polarized light and the light passing through the eighth anisotropic device 130b remains polarized in the horizontal direction.

As a result, the light passing through the third anisotropic device array 130 includes the horizontally polarized light of the odd lines and the vertically polarized light of the even lines, as light for the third viewpoint, and the vertically polarized light of the odd lines and the horizontally polarized beam of the even lines, as light for the first viewpoint. When the front polarizer 140a of the LCD panel 140 is assumed to transmit horizontally polarized light, of the light passing through the third anisotropic device array 130, only the horizontally polarized light of the odd lines of the light for the third viewpoint passes through the front polarizer 140a of the LCD panel 140 and only the horizontally polarized light of the even lines of the light for the first viewpoint passes through the front polarizer 140a of the LCD panel 140. The seventh anisotropic device 130a can be arranged on the odd lines and the eighth anisotropic device 130b can be arranged on the even lines. The seventh anisotropic device 130a of the odd lines may correspond to the pixel of the odd lines of the LCD panel 140 and the eighth anisotropic device 130b of the even lines may correspond to the pixel of the even lines of the LCD panel 140. Thus, an image is displayed by an interlacing method in which an image for the first viewpoint is formed at the pixels of the even lines and an image for the third viewpoint is formed at the pixels of the odd lines.

Figure 4:
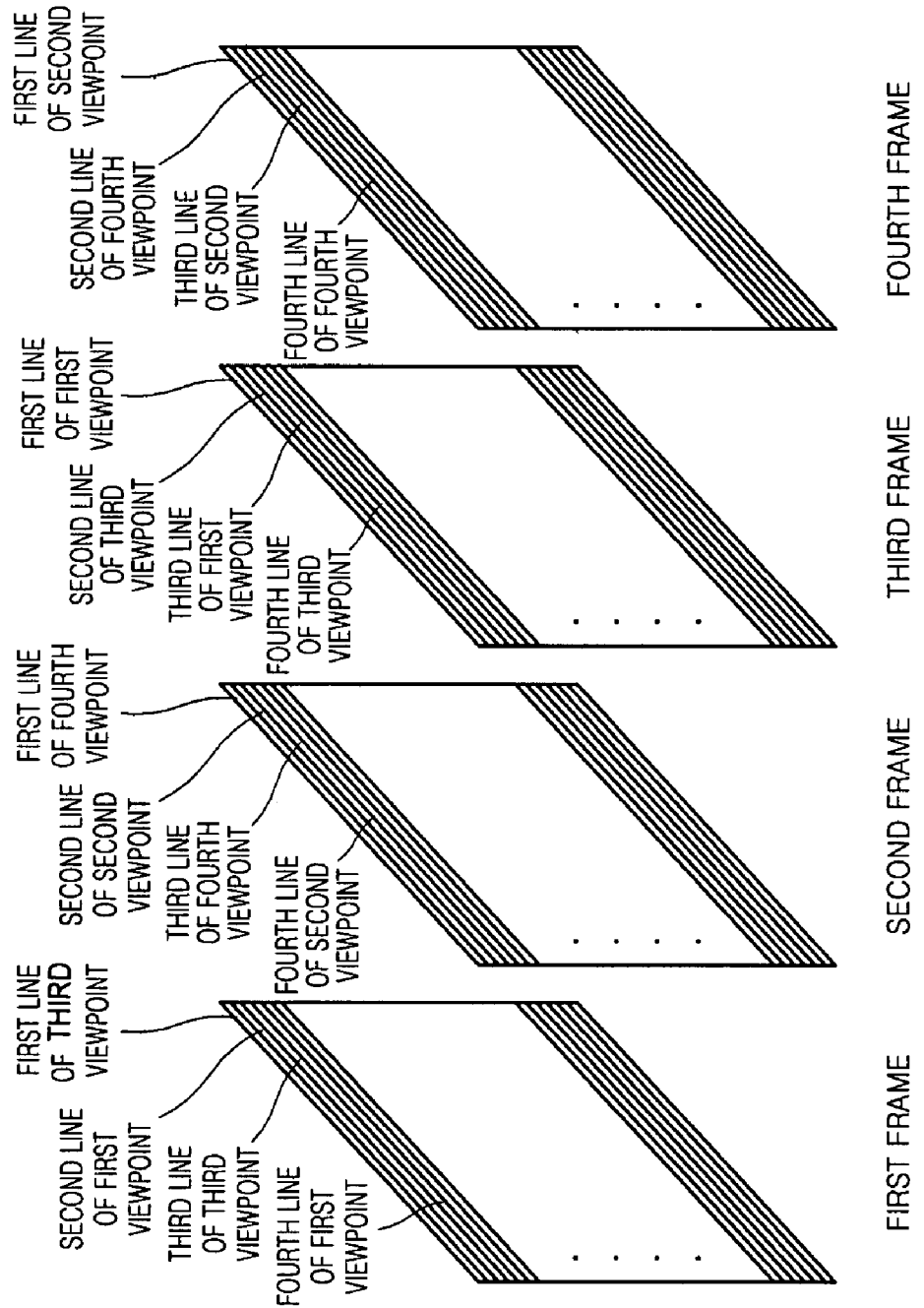
FIG. 4 illustrates a view of an image for each frame of the multiview autostereoscopic display of FIG. 1, according to an exemplary embodiment of the present invention.

When the first polarization switch 110 is off and the second polarization switch 125 is on (the third frame), the image for the first viewpoint is formed at the pixels of the odd lines and the image for the third viewpoint is formed at the pixels of the even lines. FIG. 4 illustrates lines for each of the viewpoints for the first through fourth frames, according to an exemplary embodiment of the present invention.

Referring to FIG. 3B, when the first polarization switch 110 is on and the second polarization switch 125 is off (the second frame), the light emitted from the backlight unit 100 is polarized to, for example, horizontally polarized light by the first polarized panel 106. When the first polarization switch 110 is on, the horizontally polarized light passes through the first polarization switch 110 without a change in the polarization direction and is incident on the first anisotropic device array 113. The light passing through the first and third anisotropic devices 113a and 113c can be changed to vertically polarized light and the light passing through the second and fourth anisotropic devices 113b and 113d can be changed to horizontally polarized light. Then, the second polarized panel 115 transmits only the vertically polarized light. Thus, in the present embodiment, only the light passing through the first and third anisotropic devices 113a and 113c is incident on the second anisotropic device array 120. When the vertically polarized light passes through the second anisotropic device array 120, the light passing through the fifth anisotropic device 120a remains vertically polarized and the light passing through the sixth anisotropic device 120b is changed to horizontally polarized light.

The vertically polarized light and the horizontally polarized light are separated by the lenticular lens array 123 and are emitted in different directions. The vertically polarized light proceeds in the fourth direction (the fourth viewpoint) and the horizontally polarized light proceeds in the first direction (the second viewpoint). Next, when the second polarization switch 125 is on, the light is incident on the third anisotropic device array 130 without a change in the polarization direction. Of the vertically polarized light proceeding towards the fourth direction, the light passing through the seventh anisotropic device 130a is changed to horizontally-polarized light and the light passing through the eighth anisotropic device 130b remains vertically polarized. Of the horizontally polarized light proceeding towards the second direction, the light passing through the seventh anisotropic device 130a is changed to vertically-polarized light and the light passing through the eighth anisotropic device 130b remains horizontally polarized.

As a result, the light passing through the third anisotropic device array 130 includes the horizontally polarized light of the odd lines and the vertically polarized light of the even lines, as the light for the fourth viewpoint, and the vertically polarized light of the odd lines and the horizontally polarized light of the even lines, as light for the second viewpoint. Of the light passing through the third anisotropic device array 130, only the horizontally polarized light of the odd lines of the beam for the fourth viewpoint passes through the front polarizer 140a of the LCD panel 140 and only the horizontally polarized light of the even lines of the beam for the second viewpoint passes through the front polarizer 140a of the LCD panel 140. Thus, an image is displayed by the interlacing method in which an image for the second viewpoint is formed at the pixels of the even lines and an image for the fourth viewpoint is formed at the pixels of the odd lines. By displaying the image through the interlacing method as above, a multiview autostereoscopic image can be provided at a full resolution.

When the first polarization switch 110 is on and the second polarization switch 125 is on (the fourth frame), the image for the second viewpoint is formed at the pixels of the odd lines and the image for the fourth viewpoint is formed at the pixels of the even lines. FIG. 4 illustrates lines where an image is formed for each of the viewpoints at the first through fourth frames, according to an exemplary embodiment of the present invention.

Figure 5:
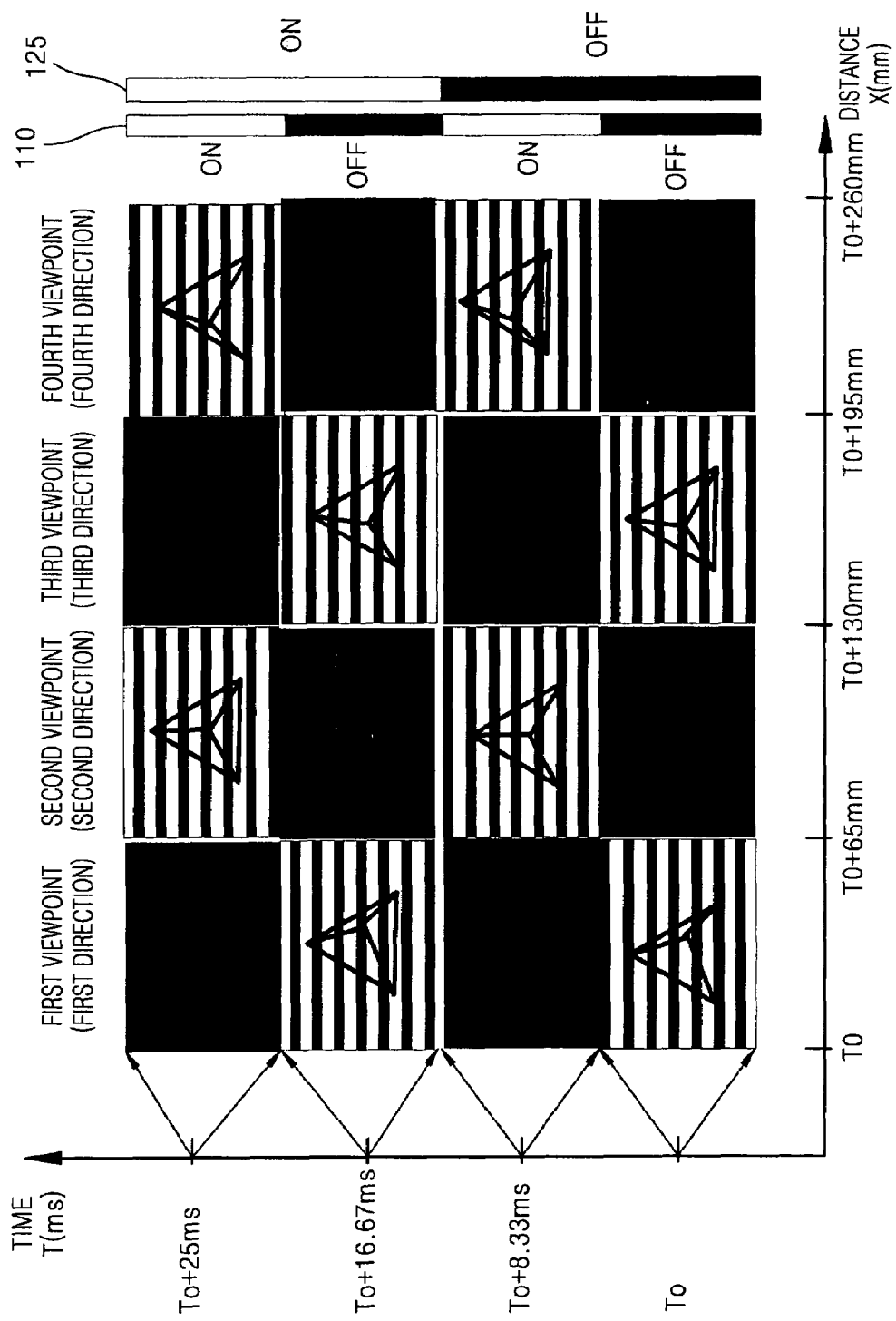
FIG. 5 illustrates a view of images at first through fourth viewpoints according to the switching of the first and second polarization switches of the multiview autostereoscopic display of FIG. 1, according to an exemplary embodiment of the present invention.

FIG. 5 illustrates a sequential operation with respect to the first through fourth viewpoints when a refresh rate is, for example, 120 Hz, according to an exemplary embodiment of the present invention. Referring to FIG. 5, when the first and second polarization switches 110 and 125 are off (the first frame), an image is formed at the first and third viewpoints when t=To. At this time, the image for the first viewpoint is formed at the pixels of the even lines, and the image for the third viewpoint is formed at the pixels of the odd lines. When the first polarization switch 110 is on and the second polarization switch 125 is off (the second frame), an image is formed at the second and fourth viewpoints when t=To+8.33 (ms). At this time, the image for the second viewpoint is formed at the pixels of the even lines, and the image for the fourth viewpoint is formed at the pixels of the odd lines. When the first polarization switch 110 is off and the second polarization switch 125 is on (the third frame), an image is formed at the first and third viewpoints when t=To+16.67. At this time, the image for the first viewpoint is formed at the pixels of the odd lines, and the image for the third viewpoint is formed at the pixels of the even lines. When the first polarization switch 110 is on and the second polarization switch 125 is on (the fourth frame), an image is formed at the second and fourth viewpoints when t=To+25 (ms). At this time, the image for the second viewpoint is formed at the pixels of the odd lines, and the image for the fourth viewpoint is formed at the pixels of the even lines.

According to the present embodiment, each of the seventh and eighth anisotropic devices 130a and 130b of the third anisotropic device array 130 can correspond to the pixel lines of the LCD panel 140. In the present embodiment, the number of seventh and eighth anisotropic devices 130a and 130b of the third anisotropic device array 130 is the same as that of the pixel lines of the LCD panel 140.

Figure 6:
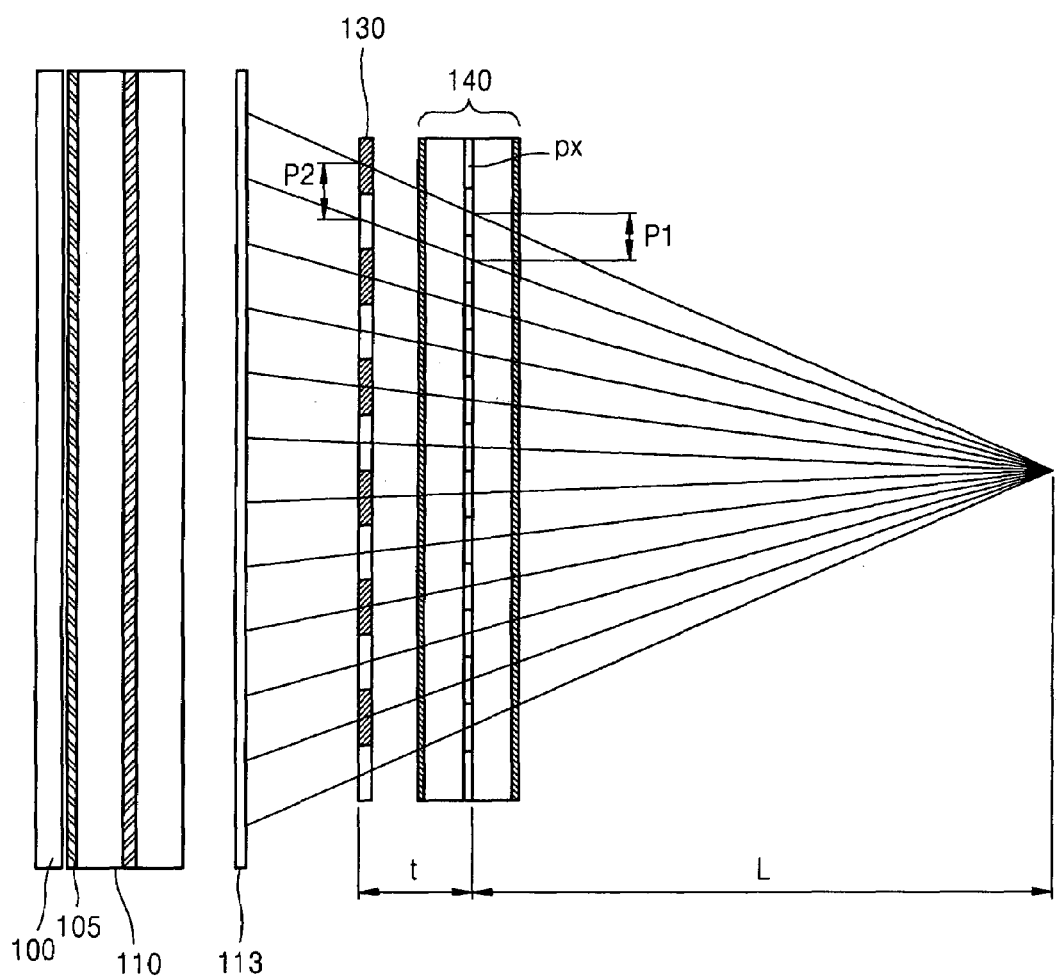
FIG. 6 illustrates a vertical-sectional view of the multiview autostereoscopic display of FIG. 1, according to an exemplary embodiment of the present invention.

Referring to FIG. 6, to prevent the occurrence of a Moire pattern on an image displayed on the LCD panel 140, the width P2 in the vertical direction of the seventh and eighth anisotropic devices 130a and 130b of the third anisotropic device array 130 is slightly greater than the pitch P1 of the pixel lines of the LCD panel 140. FIG. 6 illustrates a vertical-sectional view of the multiview autostereoscopic display of FIG. 1, according to an exemplary embodiment of the present invention. For convenience of explanation, other elements existing between the first and third anisotropic device arrays 113 and 130 are omitted in FIG. 6.

As shown in FIG. 6, the seventh and eighth anisotropic devices 130a and 130b of the third anisotropic device array 130 are arranged in the vertical direction at the rear of the LCD panel 140 from the perspective of a viewer. Also, a plurality of pixels px are arranged in two dimensions horizontally and vertically on the LCD panel 140. In FIG. 6, only the pixels px arranged in the vertical direction on the LCD panel 140 can be seen. The eye of a viewer is positioned at a point in front of the LCD panel 140. When an image is focused at a point in the viewing zone, for the beam passing through each of the seventh and eighth anisotropic devices 130a and 130b of the third anisotropic device array 130 to pass through the pixel line corresponding thereto, the seventh and eighth anisotropic devices 130a and 130b of the third anisotropic device array 130 corresponding to the pixel lines located at a higher or lower position than the eye of the viewer need to be arranged at a higher or lower position than the corresponding pixel lines. To this end, the pitch of the seventh and eighth anisotropic devices 130a and 130b of the third anisotropic device array 130 should be slightly greater than the pitch of the pixel lines of the LCD panel 140. For example, when the pitch of the pixel lines of the LCD panel 140 is about 0.265 mm, the pitch of the seventh and eighth anisotropic devices 130a and 130b of the third anisotropic device array 130 can be about 0.266 mm.

Figure 7:
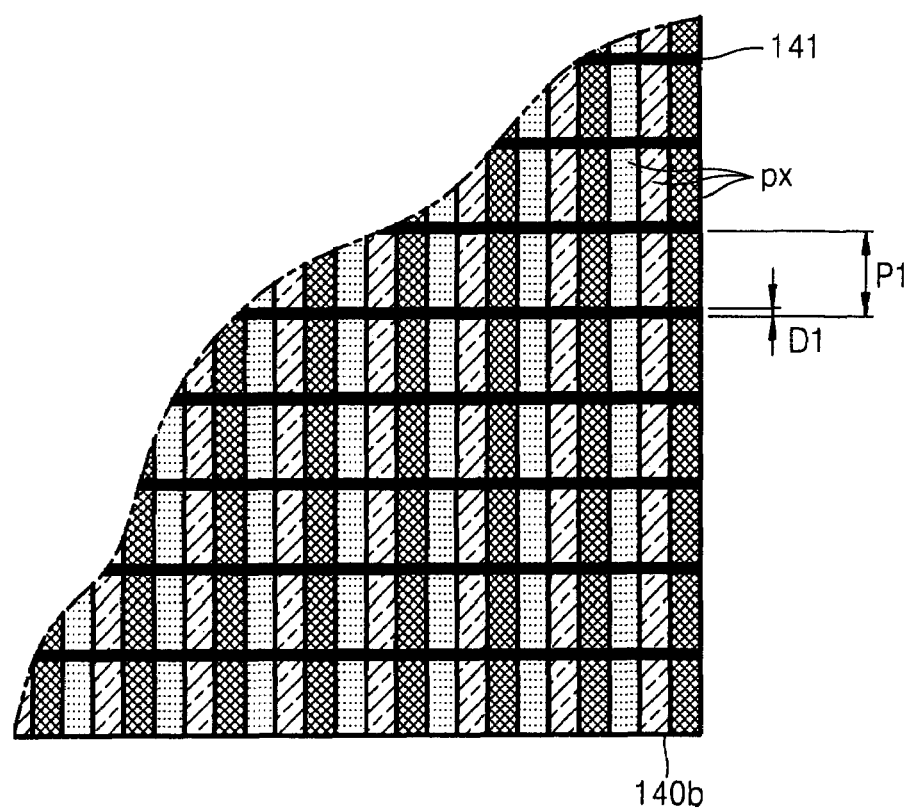
FIG. 7 illustrates a partially detailed view of a liquid crystal layer of an LCD panel adopted in the multiview autostereoscopic display of FIG. 1, according to an exemplary embodiment of the present invention.
Figure 8:
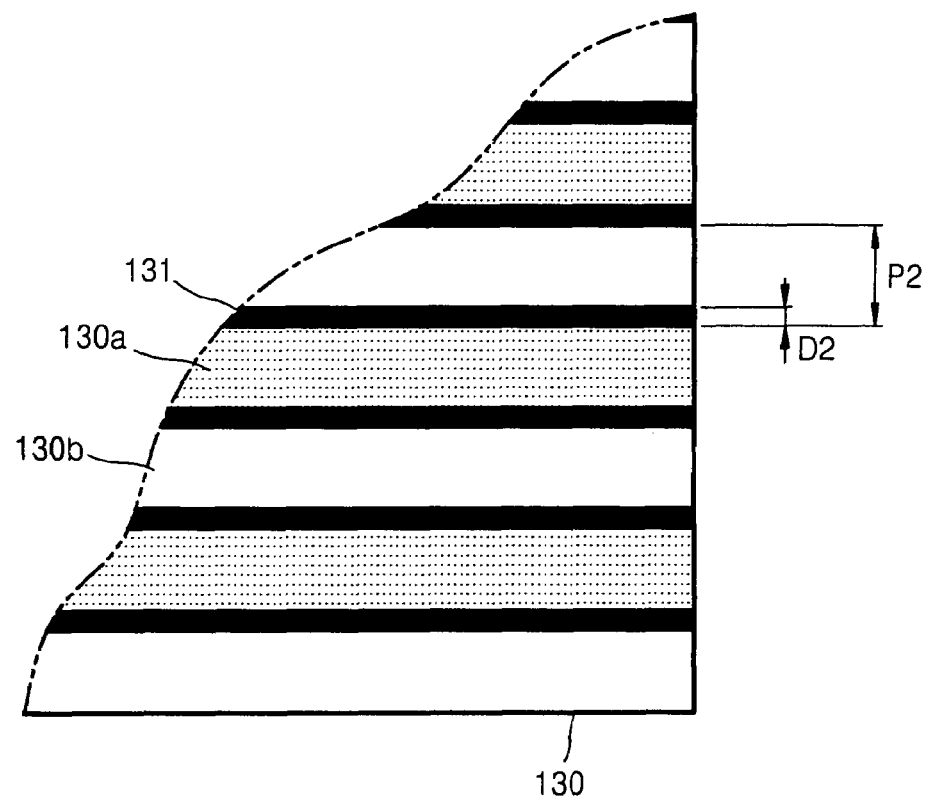
FIG. 8 illustrates a partially detailed view of a third anisotropic device array adopted in the multiview autostereoscopic display of FIG. 1, according to an exemplary embodiment of the present invention.

Crosstalk may occur where the images of neighboring viewpoints are mixed or reversed according to the height of the eye of the viewer. Thus, for the more convenient viewing of an autostereoscopic image, the range of height at which the image at the neighboring viewpoint is accurately separated may be increased. To achieve this purpose, as shown in FIG. 7, a black matrix 141 existing between the pixels px of the LCD layer 140b of the LCD panel 140 is used. In general, the LCD panel 140 has the black matrix 141 having a width of D1 in the vertical direction that is formed between the pixels px of the LCD layer 140b in order to separate the pixels px from one another. In the third anisotropic device array 130 according to the present embodiment, as shown in FIG. 9, the opaque mask 131 in a stripe shape corresponding to the black matrix 141 of the LCD panel 140 is horizontally arranged between the seventh and eighth anisotropic devices 130a and 130b of the of the third anisotropic device array 130. The width of the opaque mask 131 in the vertical direction is marked as D2.

Figure 9A:
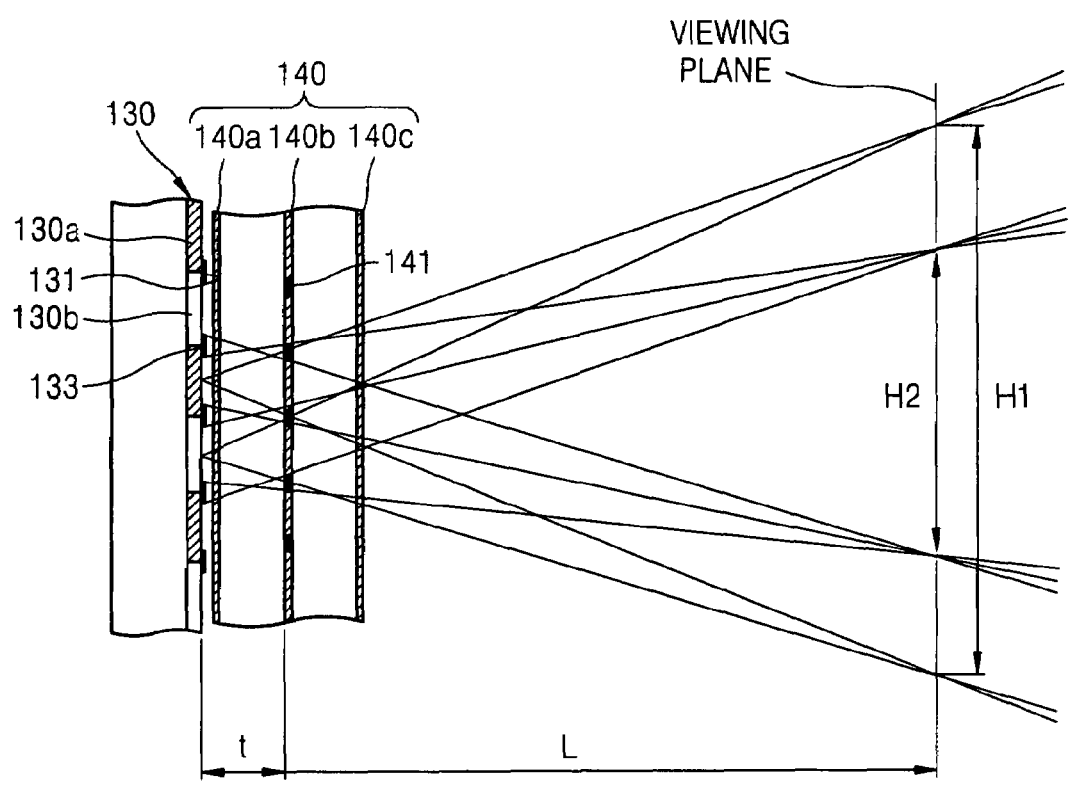
FIG. 9A illustrates a view of the structure of the multiview autostereoscopic display of FIG. 1 in which an opaque mask is formed on the third anisotropic device array, according to an exemplary embodiment of the present invention.
Figure 9B:
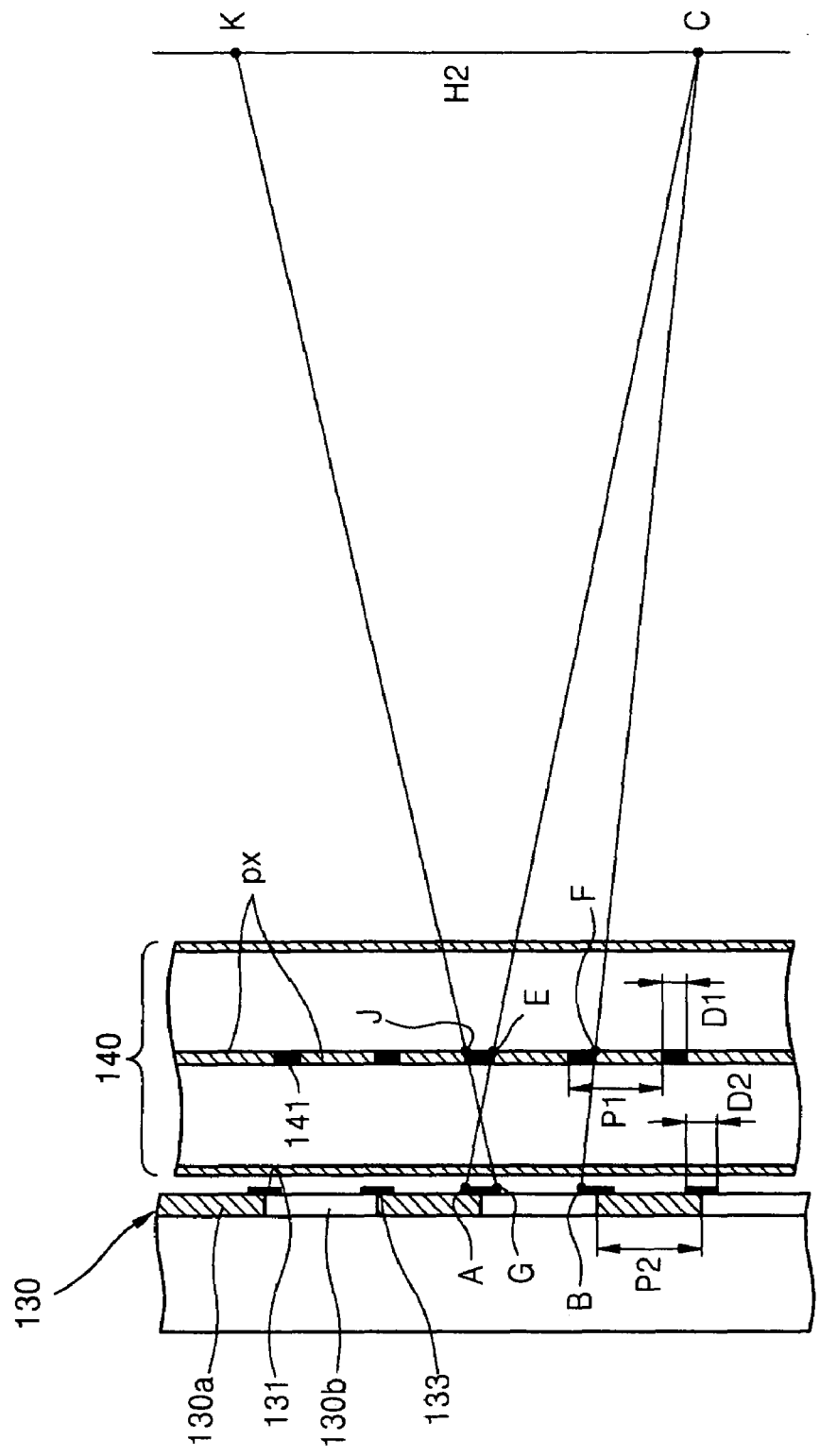
FIG. 9B illustrates a view for explaining the operational relationship between the LCD panel and the third anisotropic device array of FIG. 9A.

FIG. 9A illustrates a cross-sectional view of a state in which the opaque mask 131 and the black mask 141 are respectively arranged in the third anisotropic device array 130 and the LCD panel 140, according to an exemplary embodiment of the present invention. FIG. 9B is an enlarged view showing the major parts of FIG. 9A that explains the effect of the opaque mask 131 of the third anisotropic device array 130 and the black matrix 141 of the LCD panel 140 for the range of height at which the image of the neighboring viewpoint is accurately separated. The width in the vertical direction of the seventh and eighth anisotropic devices 130a and 130b of the third anisotropic device array 130 is P2; the width in the vertical direction of the pixel px of the LCD panel 140 is P1; the range of height at which the image of the neighboring viewpoint is accurately separated is H2; the range of height at which the image of the neighboring viewpoint is separated or reversed is H1; the distance between the third anisotropic device array 130 and the liquid crystal layer 140b of the LCD panel 140 is t; and the viewing distance from the liquid crystal layer 140b of the LCD panel 140 to a viewer is L. The width in the vertical direction of the black matrix 141 is D1, and the width in the vertical direction of the opaque mask 131 is D2. In FIG. 9B, Equation 1 can be obtained from a triangle ABC and a triangle EFC as follows.

$$\frac{P1}{L} = \frac{P2}{(L+t)} \qquad [\text{Equation 1}]$$

Equation 2 can be obtained from a trapezoid BGKC and a trapezoid FJKC.

$$\frac{t}{L} = \frac{(P1+D1)}{H2} \qquad [\text{Equation 2}]$$

Equation 3 can be obtained from the trapezoid BGKC and a trapezoid BGJF.

$$\frac{t}{L} = \frac{(P2-D2)}{(P1+D1)} \qquad [\text{Equation 3}]$$

P1 can be expressed as follows from Equations 1 and 3.

$$P1 = \frac{t}{L}D1 + D2 \qquad [\text{Equation 4}]$$

Equation 5 can be obtained by applying Equation 4 to Equation 2 and expressed with respect to H2.

$$H2 = \frac{t}{L}\left(D1 + D2 + \frac{t}{L}D1\right) \qquad [\text{Equation 5}]$$

Here, since t<<L, the term (t/L)D1 can be ignored. Thus, Equation 6 can be obtained as follows.

$$H2 = \frac{t}{L}(D1 + D2) \qquad [\text{Equation 6}]$$

Referring to Equation 6, as the widths D1 and D2 of the black matrix 141 of the LCD panel 140 and the opaque mask 131 of the third anisotropic device array 130 increase, the range H2 of height at which the image of the neighboring viewpoint is accurately separated can be greatly increased. Thus, according to the present embodiment, in order to increase the range H2 of height at which the viewpoint is accurately separated, the width of the opaque mask 131 is increased to its maximum without affecting the brightness of a displayed image. By doing so, the range H2 of height at which the viewpoint is accurately separated can be about 150-200 mm.

Figure 10:
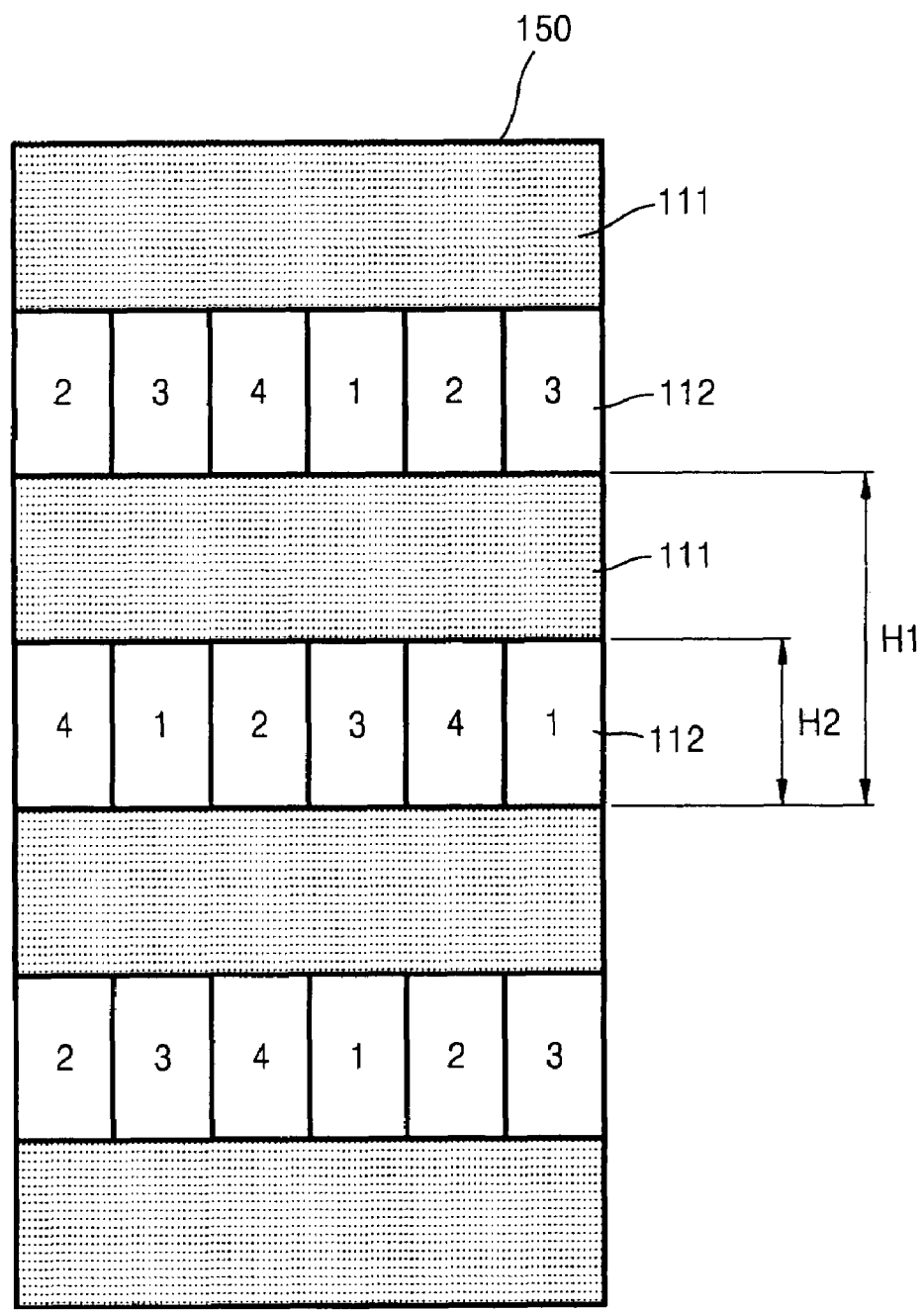
FIG. 10 illustrates a view of a viewing zone of an image formed by the multiview autostereoscopic display of FIG. 1, according to an exemplary embodiment of the present invention.

FIG. 10 illustrates a view showing a viewing zone of an image that is autostereoscopic formed by the multiview autostereoscopic display of FIG. 1, according to an embodiment of the present invention. The image that is autostereoscopic and is accurately separated can be viewed in the range H2 of height. An area 111 where the image is not separated and an area 112 where the image is reversed occurs in the range H1 of height.

In the meantime, the LCD panel 140 does not display the entire image of a frame and then an image of the next frame, but sequentially displays the image of continuous frames from the top to the bottom of a screen. Thus, while the images of the two frames displayed on a screen, crosstalk may occur that images of different viewpoints are mixed and displayed. To solve this problem, the multiview autostereoscopic display according to the present embodiment, as shown in FIG. 1, uses the backlight unit 100 of a division type that is divided into N number of segments 100a. Also, the first and second polarization switches 110 and 125 are separated and switched corresponding to the segments of the backlight unit 100. That is, the backlight unit 100 and the first and second polarization switches 110 and 125 are separated into a plurality of horizontal segments that are sequentially switched in synchronism with the vertical scanning time of the LCD panel 140. The horizontal segments of the backlight unit 100 and the first and second polarization switches 110 and 125 can be independently switched and are arranged in the vertical direction of the multiview autostereoscopic display.

According to the present embodiment, the number of segments of the backlight unit 100 and the first and second polarization switches 110 and 125 can be appropriately selected according to the design. To completely remove crosstalk, one of the segments of the backlight unit 100 and the first and second polarization switches 110 and 125 may correspond to a pixel line of the LCD panel 140. However, in the present embodiment, since the manufacturing costs are largely increased, one of the horizontal segments of each of the backlight unit 100 and the first and second polarization switches 110 and 125 corresponds to a plurality of pixel lines of the LCD panel 140. For example, the multiview autostereoscopic display can be manufactured such that one of the segments of the backlight unit 100 and the first and second polarization switches 110 and 125 corresponds to 100 pixel lines of the LCD panel 100.

In this structure, the segments of the backlight unit 100 and the first and second polarization switches 110 and 125 which are corresponding to each other can be switched at the same time. Each of the horizontal segments of the backlight unit 100 is turned on and off in synchronization with the scanning time of the pixel lines of the LCD panel 140 corresponding thereto. Thus, when different frames are simultaneously displayed on the same screen, since these frames are displayed by the beams having different polarization directions, crosstalk can be prevented.

As described above, the multiview autostereoscopic display according to the exemplary embodiments of the present invention provides a superior autostereoscopic image having no reverse display between the left and right images even when a viewer moves by displaying an image at three or more viewpoints. Thus, the viewer can more freely view the autostereoscopic image. Also, as a multiview image is displayed in an interlacing method using a display panel having a high response speed, an autostereoscopic image of a full resolution is provided. Furthermore, a high quality image is displayed, reducing crosstalk, by arranging an opaque mask of a stripe shape in an anisotropic device array.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A multiview autostereoscopic display comprising:
    a backlight unit;
    a first polarized panel which transmits light emitted from the backlight unit having a first polarization direction;
    a first polarization switch which changes the polarization direction of light incident thereon;
    a first anisotropic device array comprising first, second, third, and fourth anisotropic devices which are sequentially and repeatedly arranged in a horizontal direction, which transmits light such that light transmitted by an anisotropic device has a polarization perpendicular to a polarization of light transmitted by a neighboring anisotropic device;
    a second polarized panel which transmits light emitted from the first anisotropic device array having a second polarization direction;
    a second anisotropic device array, comprising fifth and sixth anisotropic devices alternately arranged in the horizontal direction, which transmits light such that light transmitted by the fifth anisotropic devices has a polarization perpendicular to a polarization of light transmitted by the sixth anisotropic devices;
    a lenticular lens array comprising a plurality of lenticular lens devices which are arranged in the horizontal direction, the lenticular lens array separating light transmitted from the first, second, third, and fourth anisotropic devices into different directions;
    a second polarization switch which changes the polarization direction of light incident thereon;
    a third anisotropic device array, comprising seventh and eighth anisotropic devices which are alternately arranged in a vertical direction, which transmits light such that light transmitted by the seventh anisotropic devices has a polarization perpendicular to a polarization of light transmitted by the eighth anisotropic devices; and
    a display panel which forms an image by modulating incident light.

2. The multiview autostereoscopic display of claim 1, wherein the first, second, third, and fourth anisotropic devices each correspond to one of the lenticular lens devices.

3. The multiview autostereoscopic display of claim 2, wherein a pitch of the lenticular lens devices is not greater than a sum of widths in the horizontal direction of the first, second, third, and fourth anisotropic devices.

4. The multiview autostereoscopic display of claim 1, wherein the fifth and sixth anisotropic devices each correspond to one of the lenticular lens devices.

5. The multiview autostereoscopic display of claim 4, wherein a pitch of the lenticular lens devices is not greater than a sum of widths in the horizontal direction of the fifth and sixth anisotropic devices.

6. The multiview autostereoscopic display of claim 1, wherein each of the seventh and eighth anisotropic devices correspond to one of a plurality of pixel lines of the display panel.

7. The multiview autostereoscopic display of claim 6, further comprising an opaque mask having a stripe shape disposed between the seventh and eighth anisotropic devices.

8. The multiview autostereoscopic display of claim 7, further comprising a black matrix disposed between pixels of the display panel,
    wherein a width of the black matrix in the vertical direction is D1, a width of the opaque mask in the vertical direction is D2, a distance between a pixel of the display panel and the third anisotropic device array is t, a viewing distance from the display panel is L, and a height H2 of a viewing zone where crosstalk does not occur satisfies an equation that:

$H2=(L/t)(D1+D2)$.

9. The multiview autostereoscopic display of claim 6, wherein a width in the vertical direction of the seventh and eighth anisotropic devices is not less than a pitch in the vertical direction between pixel lines of the display panel.

10. The multiview autostereoscopic display of claim 6, wherein each of the first and second polarization switches comprises one of an electrically-controllable liquid crystal retarder and an electrically-controllable polarization rotator.

11. The multiview autostereoscopic display of claim 1, wherein a distance between the first anisotropic device array and the lenticular lens array is not less than a focal length of the lenticular lens device.

12. The multiview autostereoscopic display of claim 1, wherein each of the first through fourth anisotropic devices comprises a polarizer having a predetermined polarization surface, wherein the polarization surfaces of neighboring anisotropic devices are perpendicular to each other.

13. The multiview autostereoscopic display of claim 1, wherein each of the fifth and sixth anisotropic devices comprises a polarizer having a predetermined polarization surface, wherein the polarization surfaces of the polarizers forming the fifth and sixth anisotropic devices are perpendicular to each other.

14. The multiview autostereoscopic display of claim 1, wherein each of the seventh and eighth anisotropic devices comprises a polarizer having a predetermined polarization surface, wherein the polarization surfaces of the polarizers forming the seventh and eighth anisotropic devices are perpendicular to each other.

15. The multiview autostereoscopic display of claim 1, wherein each of the first through fourth anisotropic devices comprises a retarder that delays the incident beam by a predetermined phase, wherein a phase delay difference between neighboring anisotropic devices is $\lambda/2$.

16. The multiview autostereoscopic display of claim 1, wherein each of the fifth and sixth anisotropic devices comprises a retarder that delays the incident beam by a predetermined phase, wherein a phase delay difference between the retarders forming the fifth and sixth anisotropic devices is $\lambda/2$.

17. The multiview autostereoscopic display of claim 1, wherein each of the seventh and eighth anisotropic devices comprises a retarder that delays the incident beam by a predetermined phase, wherein a phase delay difference between the retarders forming the seventh and eight anisotropic devices is $\lambda/2$.

18. The multiview autostereoscopic display of claim 1, wherein each of the first through fourth anisotropic devices comprises a rotator that rotates incident beam by a predetermined angle, wherein a rotation angle difference between neighboring anisotropic devices is 90°.

19. The multiview autostereoscopic display of claim 1, wherein each of the fifth and sixth anisotropic devices comprises a rotator that rotates incident beam by a predetermined angle, wherein a rotation angle difference between the rotators forming the fifth and sixth anisotropic devices is 90°.

20. The multiview autostereoscopic display of claim 1, wherein each of the seventh and eighth anisotropic devices comprises a rotator that rotates incident beam by a predetermined angle, and a rotation angle difference between the rotators forming the seventh and eighth anisotropic devices is 90°.

21. The multiview autostereoscopic display of claim 1, wherein the first and second polarization switches are switched in synchronization with an operation of the display panel.

22. The multiview autostereoscopic display of claim 1, wherein the backlight unit and the first and second polarization switches are separated into a plurality of segments and the segments are sequentially operated.

23. The multiview autostereoscopic display of claim 1, wherein the display panel displays interlacing images for a plurality of viewpoints.

* * * * *